Dec. 21, 1965    J. F. TURLEY ETAL    3,225,232
VARIABLE SPEED PORTABLE TOOL
Filed Oct. 17, 1962    3 Sheets-Sheet 1
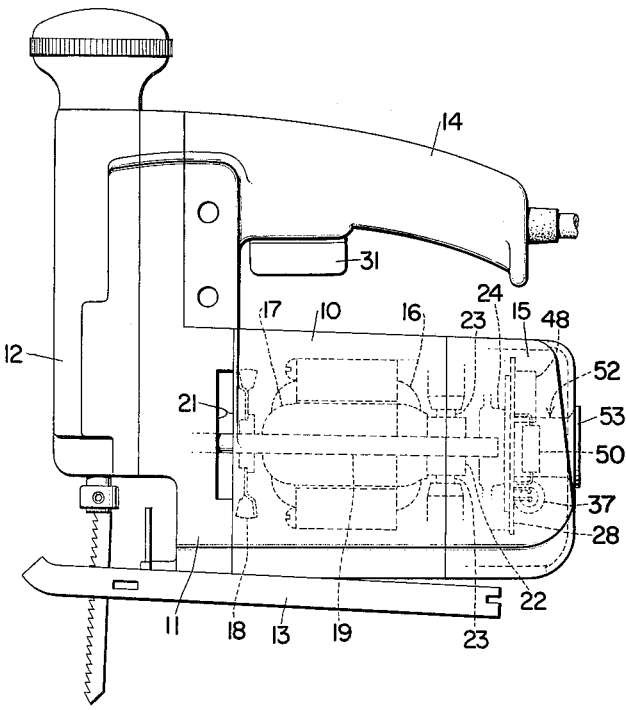
Fig. 1
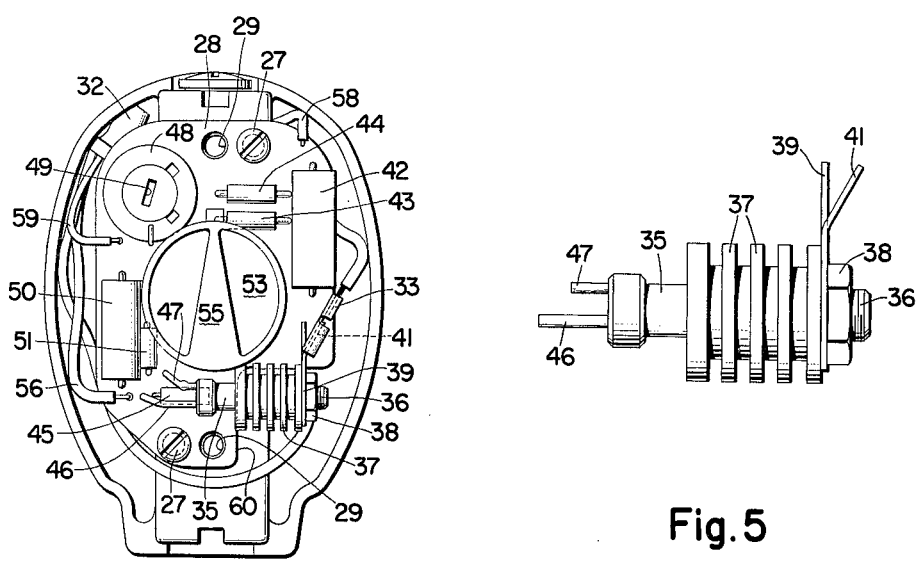
Fig. 2
Fig. 5
WITNESS
William Martin Jr.
INVENTORS
James F. Turley
Don B. Winchester
BY
ATTORNEY Dec. 21, 1965  J. F. TURLEY ETAL  3,225,232
VARIABLE SPEED PORTABLE TOOL
Filed Oct. 17, 1962  3 Sheets-Sheet 2

INVENTORS
James F. Turley
Don B. Winchester

WITNESS
William Martin Jr.

BY
J. G. Stanford
ATTORNEY

Dec. 21, 1965  J. F. TURLEY ETAL  3,225,232
VARIABLE SPEED PORTABLE TOOL
Filed Oct. 17, 1962  3 Sheets-Sheet 3

WITNESS
William Martius Jr.

INVENTORS
James F. Turley
Don B. Winchester
BY
ATTORNEY

United States Patent Office 3,225,232
Patented Dec. 21, 1965

3,225,232
VARIABLE SPEED PORTABLE TOOL
James F. Turley, Cranford, N.J., and Don B. Winchester, Pickens, S.C., assignors, by mesne assignments, to The Singer Company, New York, N.Y., a corporation of New Jersey
Filed Oct. 17, 1962, Ser. No. 231,144
4 Claims. (Cl. 310—68)

This invention relates to a portable tool powered by an electric motor having a built-in-speed-responsive regulating circuit with external means for setting the speed.

Heretofore it has been common practice in the art of portable electric tools merely to supply an "on-off" switch with a series motor and allow the speed be governed solely by the load imposed by the operator in accordance with the torque-speed characteristic.

With the advent of solid state semiconductor controlled rectifiers it becomes possible to control the motor speed somewhat independently of the load by using the small speed-responsive voltage of the armature as a feed-back signal to control the firing of the rectifier. This permits the tool to be selectively operated at its optimum cutting speed for any given job and is an obvious advantage where quality and time are important.

These advantages, however, would not be worthwhile if, due to the circuit complexities and the thermal limitations of the semiconductor devices, the cost, weight and size of the final product were to be unduly increased.

The problem from a practical standpoint then is to simplify the assembly of the speed-regulating circuit in the conventional tool so that the added cost is fractional without compromising the portability, electrical safety and useful life of the tool.

It is a primary object of this invention to provide portable electric tools having inherent speed-responsive regulation including preset speed control without substantially increasing the cost, size, and weight over that of conventional single-speed tools.

It is a more specific object of this invention to provide a simple motor-control circuit board which mounts all necessary components including a semiconductor control element and which is positioned to serve also as an air baffle to direct inlet motor-cooling air selectively over the semiconductor element to maintain its junction temperature below a safe level.

It is a still further object of this invention to provide a portable electric tool having a speed-regulating circuit containing an adjustable control element which may be used for a final factory calibration setting to obtain consistent low speed values to compensate for usual manufacturing tolerances.

This has been accomplished according to this invention by the use of a single compact circuit board containing a few small passive electrical components, which board may be secured by two screws to the presently existing bearing bracket and which components are connected electrically to the motor circuit by four leads and requires as a modified mechanical part only an end-cover having a slightly increased length and an aperture for access to the control element.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, FIG. 1 is a side elevation view of a device embodying the invention.

FIG. 2 is an end elevation view of the device of FIG. 1 with an end-cover removed to show the internal construction.

FIG. 5 is a detail of an element shown assembled in FIG. 2.

Figure 3:
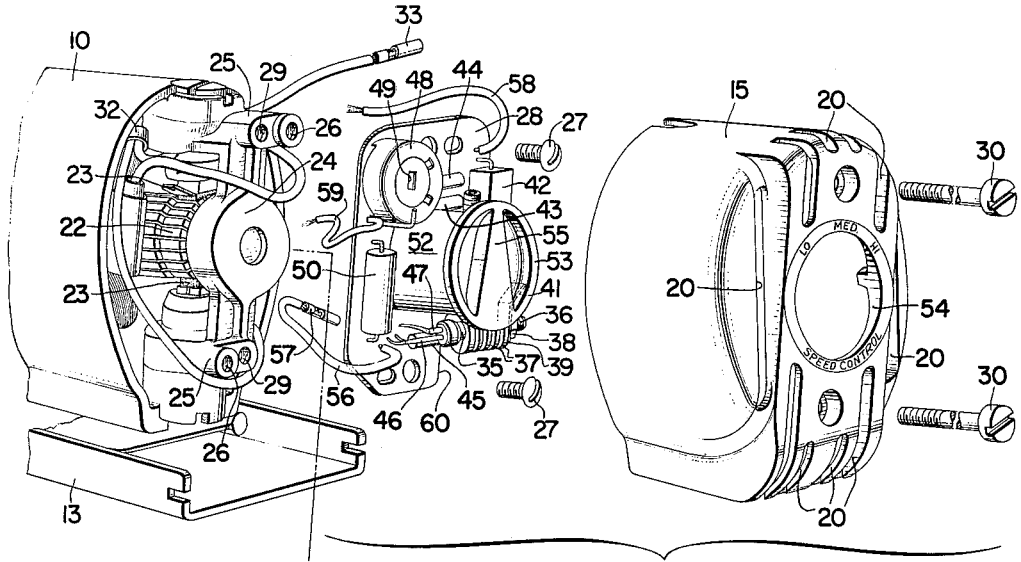
FIG. 3 is an exploded view illustrating the assembly of the device of FIG. 1.

Referring now to the drawings the present invention is shown embodied in a sabre saw having a motor housing 10, a gear housing 11, a gear-housing cover 12, a base plate 13 a handle 14 and an end-cover 15, as shown in FIG. 1.

An electric motor of the universal type having the field winding 16 in series with the armature winding 17 is journaled in the motor housing 10.

A fan 18 secured to the motor shaft 19 provides circulation of cooling air which is drawn in through apertures 20 in the end-cover 15 and is exhausted through outlet openings 21 in the sides of the gear housing 11. The motor is provided with the usual commutator 22 and brushes 23.

As seen best in FIG. 3, the motor housing 10 is formed with a rearwardly extending bearing bracket 24 having diametrically positioned bosses 25. Tapped holes 26 receive screws 27 for securing a printed-circuit board 28 and tapped holes 29 receive screws 30 for securing the end-cover 15 to the motor housing 10.

Figure 6:
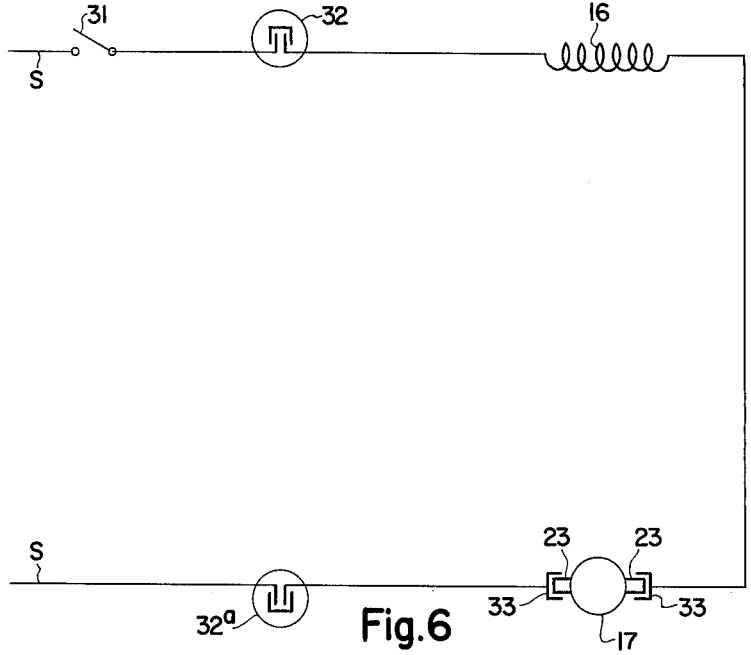
FIG. 6 is a schematic wiring diagram illustrative of the prior art.

It will be understood that ordinarily, in accordance with prior art practice, the motor is connected as shown in FIG. 6 wherein the field winding 16 and armature winding 17 are connected in series through an "on-off" switch 31 to a regular source S—S of alternating current voltage. The conventional solderless connectors are indicated at 32, 32a and at 33 the usual push-on connectors are indicated. In this case, the circuit board 28 of the present invention is not used and a substitute end-cover 15a may be used as shown in FIG. 3. The end-cover 15a may be shorter than the end-cover 15 and is secured to the motor housing 10 by means of screws 30a. As thus assembled, the sabre saw is essentially a single speed tool and the user must accept whatever speed results from the load imposed.

When it is desired to adapt this prior art tool for controlled speed operation according to this invention it is only necessary to add the circuit board 28, make four simple electrical connections and substitute a new end-cover 15 and screws 30 as will now be described.

Figure 4:
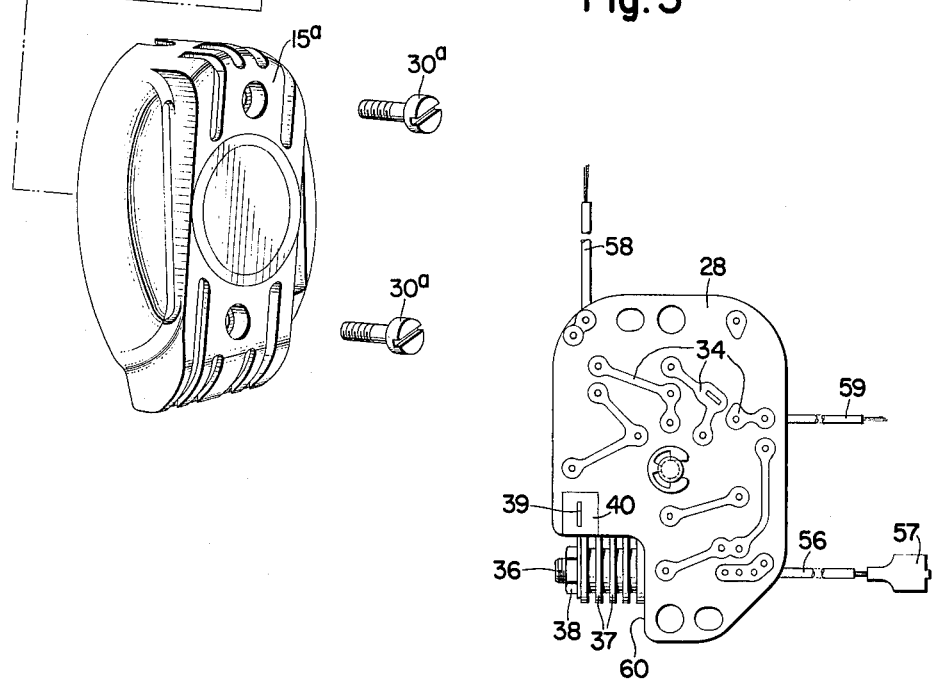
FIG. 4 is a detail of one of the components of the assembly of FIG. 3.

The circuit board 28 mounts all of the electrical components necessary to provide a speed-responsive regulating function including presetting of high, low and medium speeds. The circuit formed by printed conductors 34 on the back of the board 28, as shown in FIG. 4, may, in this embodiment be basically the same as that shown and described in the United States Patent No. 2,939,064 to which reference may be had for a more complete understanding thereof.

As shown in FIG. 5 a silicon controlled rectifier 35 has its anode stud 36 formed with heat radiating fins 37. A nut 38 threaded onto the stud 36 secures the rectifier 35 to a metal bracket 39 which in turn is pushed through the board 28 and is soldered to a tab 40 shown in FIG. 4. The bracket 39 is formed with a bent terminal portion 41 to receive the push-on terminal 33 for connection with the field winding 16 as seen best in FIG. 2. A cathode terminal 46 and a gate terminal 47 are provided as shown.

Fixed resistors 42, 43, 44, and 45 are mounted in conventional manner. An adjustable pot resistor 48 has a screw driver slot 49 for factory calibration of the low speed setting.

A condenser 50 and a diode 51 are mounted as shown. A three-position selector switch 52, when electrically connected to the printed circuit as shown, is self supporting and carries an insulated knob 53 which reaches through an aperture 54 in the end-cover 15 for external manipulation. The knob 53 is formed with a grip pointer portion 55 which cooperates with the indicia "LO, MED, HI" on the end-cover to provide convenient means for pre-setting the speed of the motor.

Figure 7:
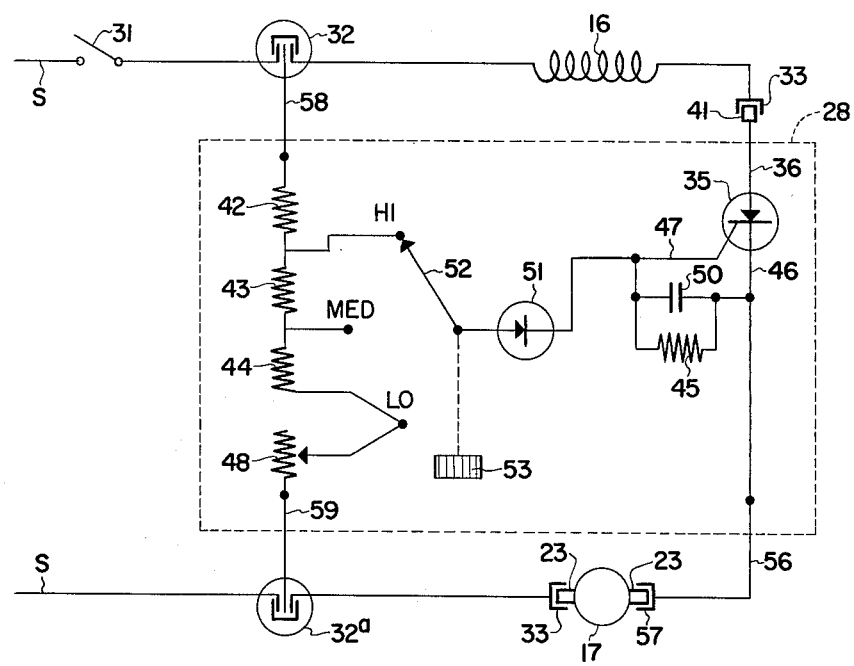
FIG. 7 is a schematic wiring diagram showing modification to apply present invention to the prior art.

A lead 56 from the cathode terminal 46 carries a push-on terminal 57 for connection to the brush terminal 23 as shown in FIG. 7. A lead 58 from the end of resistor 42 connects to the solderless connector 32 and a lead 59 from the adjustable resistor 48 connects to the solderless connector 32a as seen.

It will be seen that the circuit board 28 is mounted transversely of the motor axis and from FIG. 4, it is apparent that the stud 36 and cooling fins 37 of the silicon controlled rectifier overhangs a cut-out portion 60 of the board 28. With the above structure the circuit board 28 provides an air baffle which selectively directs the ventilating air entering through the inlet apertures 20 to flow over the fins 37 at high velocity to effect special cooling of the silicon controlled rectifier to keep the junction temperature thereof within the rated values independently of the motor temperature. This is of particular importance in rendering the tool just as reliable with the regulating circuit as without it and failure will still be limited by motor heating rather than by heating of the rectifier.

From the above it will be perceived that there is provided according to this invention a simple inexpensive structure by means of which prior art portable power tools may with facility be adapted for preselected speed control and with speed-responsive regulation and without comprising the reliability inherent in the original tool.

Having thus set forth the nature of the invention what we claim herein is:

1. In a portable tool powered by an electric motor, a housing for said motor formed with a rearwardly extending bearing bracket having diametrically positioned bosses integral therewith, an armature having one of its ends journaled in said rearwardly extending bearing bracket, a motor-control circuit board secured to said diametrically positioned bosses and positioned transversely of the axis of rotation of said armature, an end-cover containing air inlet openings and a knob aperture and forming with said motor housing a protective enclosure for said circuit board, fan means providing a flow of cooling air through said air inlet openings around said circuit board and along the axis of said armature, and stationary electrical components mounted on said circuit board including an operator-adjustable control element having an insulated turnable knob projecting through the knob aperture in said end cover, said knob being turnable on an axis substantially parallel to the axis of rotation of said armature.

2. In a portable tool powered by an electric motor, a housing for said motor formed with a rearwardly extending portion, an armature journaled at one end in said rearwardly extending portion, a motor-control circuit board secured to said housing portion and positioned transversely of the axis of rotation of said armature, an end-cover containing air inlet openings and a control aperture and forming with said motor housing a protective enclosure for said circuit board, fan means providing a flow of cooling air through said inlet openings around said circuit board and along the axis of said armature, and stationary electrical components mounted on said circuit board including an operator-adjustable control element having an insulated handle projecting through said control aperture in said end-cover for external selection of predetermined motor speeds.

3. In a portable tool powered by an electric motor, a housing for said motor formed with a rearwardly extending portion, an armature journaled at one end in said rearwardly extending portion, a motor-control circuit board in the form of a thin flat wafer, means mounting said circuit board on said housing portion in a position transverse to the axis of rotation of said armature, an end-cover containing air inlet openings and a control aperture and forming with said motor housing a removable protective enclosure for said circuit board, fan means providing a flow of cooling air through said inlet openings around said circuit board and along the axis of said armature and stationary electrical components mounted on said circuit board on the side thereof facing said air inlet openings, one of said components being an operator-adjustable control element having an insulated handle projecting through said control aperture for manipulation externally of said tool.

4. In a portable tool powered by an electric motor, a housing for said motor formed with a rearwardly extending portion, an armature journaled at one end in said rearwardly extending portion, a motor-control circuit board, means mounting said circuit board adjacent to said housing portion in a position transverse to the axis of rotation of said armature, a removable end-cover containing air inlet openings and a control aperture and forming with said motor housing a protective enclosure for said circuit board, fan means providing a flow of cooling air through said inlet openings around said circuit board and along the axis of said armature, and stationary electrical components mounted on said circuit board adjacent to said air inlet openings including an operator-adjustable control element having an insulated handle actuatable through said control aperture in said end-cover.

References Cited by the Examiner

UNITED STATES PATENTS

| | | | |
|---|---|---|---|
| 2,711,461 | 6/1955 | Happe | 310—50 |
| 2,740,029 | 3/1956 | Kueser et al. | 310—72 |
| 2,934,662 | 4/1960 | Robinson | 310—68.4 |
| 2,939,064 | 5/1960 | Momberg et al. | 318—246 |

OTHER REFERENCES

Application Note, 200.4 6/61, by F. W. Gutzwiller, June 1961, page 1.

ORIS L. RADER, *Primary Examiner.*

MILTON O. HIRSHFIELD, *Examiner.*